United States Patent [19]
Dumovich

[11] 3,872,610
[45] Mar. 25, 1975

[54] MATHEMATICS TEACHING APPARATUS
[76] Inventor: Matt J. Dumovich, 2151 Illion St., San Diego, Calif. 92110
[22] Filed: Nov. 21, 1973
[21] Appl. No.: 418,066

[52] U.S. Cl............................ 35/30, 35/31 D, 35/32
[51] Int. Cl. ............................................ G09b 19/02
[58] Field of Search... 35/30, 31R, 31A, 31B, 31D, 35/32, 33, 35B, 76; 40/65 R; 116/135, 131; 235/71 A, 86

[56] References Cited
UNITED STATES PATENTS

| | | | |
|---|---|---|---|
| 692,019 | 1/1902 | Kolshorn............................ | 35/32 X |
| 1,394,305 | 10/1921 | Hurley ................................ | 35/76 |
| 1,773,670 | 8/1930 | Girlich ................................ | 40/65 |
| 2,893,347 | 7/1959 | Freiberg............................. | 116/135 |
| 3,126,648 | 3/1964 | Strong et al........................ | 35/35 B |
| 3,129,518 | 4/1964 | Burris ................................ | 35/31 D |
| 3,201,882 | 8/1965 | Alford et al. .................. | 116/135 X |
| 3,462,854 | 8/1969 | Schwartz.............................. | 35/32 |
| 3,599,350 | 8/1971 | Moskowitz............................. | 35/30 |
| 3,721,021 | 3/1973 | Stewart ............................... | 35/35 B |
| 3,722,110 | 3/1973 | Morrisey et al........................ | 35/30 |

FOREIGN PATENTS OR APPLICATIONS
569,650    2/1933    Germany

*Primary Examiner*—Wm. H. Grieb
*Attorney, Agent, or Firm*—Brown & Martin

[57] ABSTRACT

An apparatus for teaching mathematical concepts and particularly different base-value number systems. A scroll is turned into position behind openings in a display panel to display the appropriate integers for the base-value selected. A pointer is movable into association with each integer and operates a column-content-indicator so that the content of the column is continuously displayed. Transparent cylindrical object receptacles surround each number opening so that objects may be placed in the cylinder to indicate when the number position is filled.

6 Claims, 6 Drawing Figures

MATHEMATICS TEACHING APPARATUS

BACKGROUND OF THE INVENTION

In the teaching of number systems and abstract mathematical concepts to students through college age, there has been a great deal of emphasis, in recent years, on providing the student with a good grasp of the abstract concepts before forcing the route calculations upon him. This overall approach has been referred to popularly as the 'new math.' In actual practice, however, despite the utilization of more conceptual terminology than had been the case in previous years, there has been no real mechanism whereby the student may be given an opportunity to experiment with these mathematical concepts.

A particular example of the deficiency of the current teaching techniques is the teaching of different base-value number systems. Whereas, according to current practice the student is taught that it is possible to have many different base-value number systems, in addition to the decimal system, nevertheless there is no real opportunity for the student to experiment with and make a natural transition between the various base-value number systems, and he therefore is forced to accept the correctness of the abstract concept before actually developing an understanding of it.

A principle cause of the inability to teach the abstract concepts in mathematics, including the theory of different base-value number systems has been the lack of any suitable device that would permit display and experimentation by the teacher and student working together or separately. All of the material has been textual in nature, and there has been no manipulative device which can augment the printed material.

It is therefore desirable to have a teaching apparatus which is capable of demonstrating the operation of a number of different base number systems as well as other mathematical concepts and particularly so where such a device may be manipulated by the student to permit the student to develop his own understanding of the concept and experiment with problem solving techniques.

SUMMARY OF THE INVENTION

An exemplary embodiment of the invention incorporates a display panel behind which is mounted a plurality of number scrolls. The number scrolls are arranged so as to display, through holes in the display panel, the numbers corresponding to the integers for each column, in a plurality of columns, for any selected number system. Associated with each column there is a column-contents-indicator. This indicator is driven by a pointer in such a manner than when the pointer is adjacent an integer in a column, there is a device for displaying a pre-selected set value for each column.

The display opening for each number, in each column, is surrounded by a transparent cylinder which acts as a receptacle for elongated dowels. Thus the dowels may be placed in the cylinder and it will still be possible to read the numeral on the number scroll.

While the operation of the invention will be described principally with respect to its utilization in the teaching of and experimentation with different base-value number systems, it is to be understood that the invention has application to the teaching of other concepts as well. In particular, and without limitation, the invention may be utilized in the teaching of the concept of zero, expanded numeration, strained expectation, color code systems, radio-telegraph code, geometric symbols, braille numerals, number density, and fractions.

It is therefore an object of the invention to provide a new and improved mathematics teaching apparatus.

It is another object of the invention to provide a new and improved mathematics teaching apparatus capable of demonstrating numerous mathematical concepts.

It is another object of the invention to provide a new and improved mathematics teaching apparatus that is capable of demonstrating different base-value number systems.

It is another object of the invention to provide a new and improved mathematics teaching apparatus that automatically displays column contents.

It is another object of the invention to provide a new and improved mathematics teaching apparatus that may be economically produced.

It is another object of the invention to provide a new and improved mathematics teaching apparatus that may be made in a large range of sizes.

It is another object of the invention to provide a new and improved mathematics teaching apparatus that makes it possible to use a manipulative teaching technique.

Other objects and many attendant advantages of the invention will become more apparent from a reading of the following detailed descriptions, together with the drawings in which like reference numerals refer to like parts throughout and in which.

Figure 1:
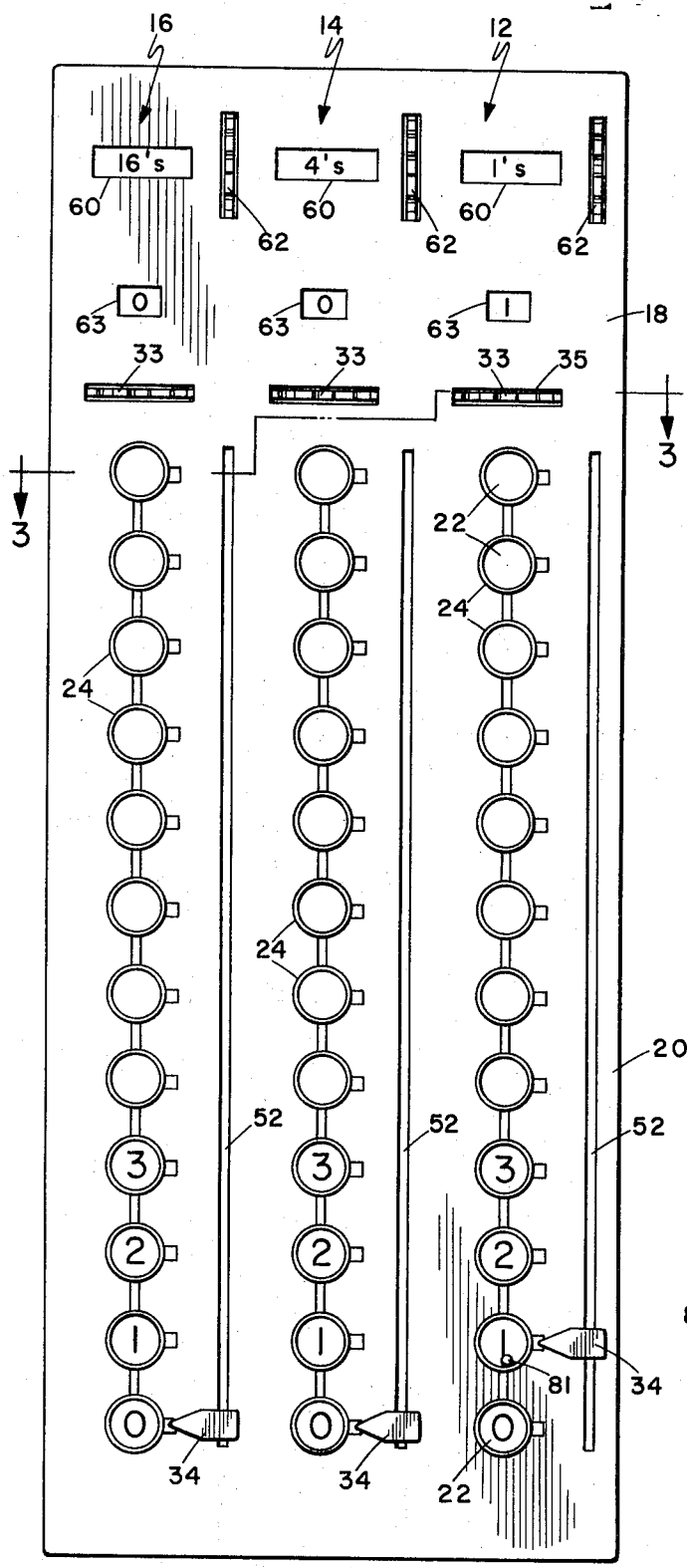
FIG. 1 is a front elevation view of the apparatus.
Figure 2:
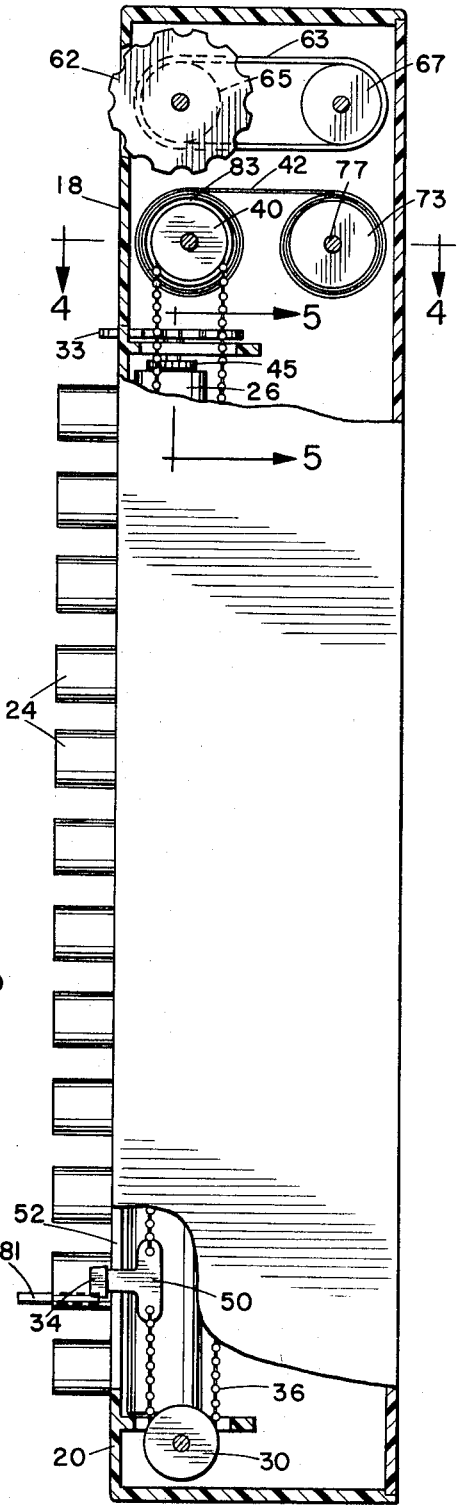
FIG. 2 is a side elevation view with portions cut away.
Figure 3:
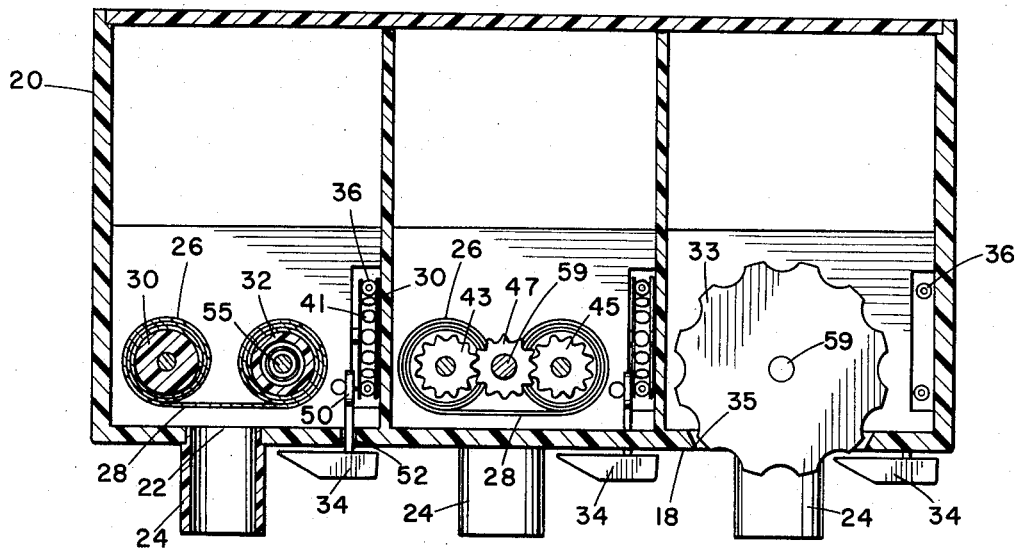
FIG. 3 is an enlarged sectional view taken on line 3—3 in FIG. 1.
Figure 4:
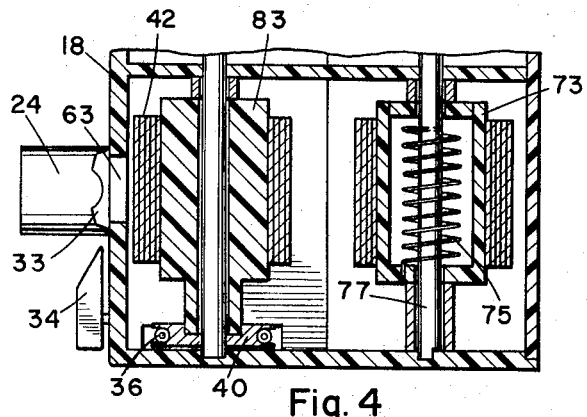
FIG. 4 is an enlarged sectional view taken on line 4—4 in FIG. 2.
Figure 5:
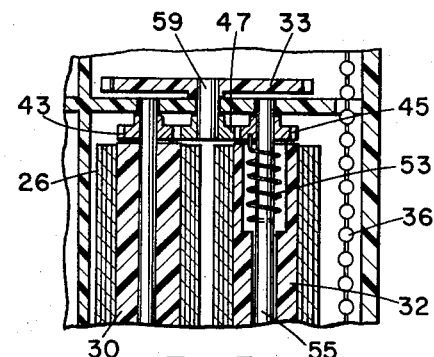
FIG. 5 is an enlarged sectional view taken on line 5—5 in FIG. 2.
Figure 6:
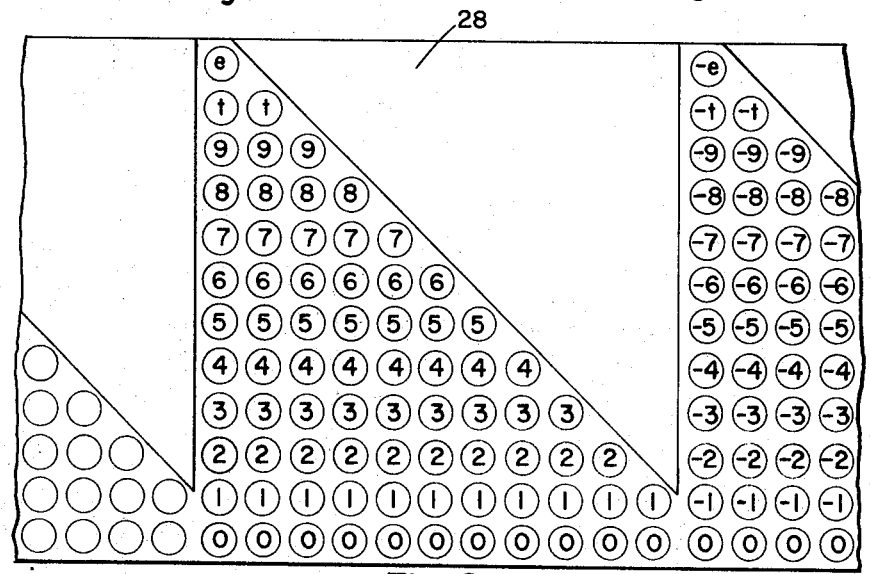
FIG. 6 illustrates a portion of a typical primary scroll used in the apparatus.

Referring now to the drawings, there is illustrated a mathematics teaching apparatus. The device is mounted in a housing 20 which includes a display panel 18. Three number columns 12, 14, and 16 are illustrated. It is to be understood that the concept of the invention is equally applicable to more or less columns.

The mechanism associated with each number column is substantially identical. Therefore, the mechanism associated with the number column 12 will be described in detail and it is to be understood that that mechanism is duplicated for each additional column employed.

The display panel 18 is penetrated by a plurality of display holes 22. The display holes are surrounded by transparent plastic receptacles 24. A number scroll 26, comprising an imprinted length of flexible sheet material 28 is wound on two rolls 30 and 32.

The rolls 30 and 32 are mounted with their axes vertically and positioned on either side of the display holes 22. A central drive gear 47 co-operates with gears 43 and 45 on the rolls 30 and 32 respectively so that rotation of drive gear produce opposite rotation of the rollers 30 and 32 and causes the sheet material 28 to be wound from one roller to the other. A spring compensator is provided to allow for the differential rotation rate produced when more of the sheet material is on one roller than the other. The compensator consists of a helical spring 53 fixed at its first end to the gear 45 and at its second end to shaft 55 which is fixed to roller 32.

A thumb wheel 33 protrudes through an opening 35 in the panel 18. The thumb wheel is connected to the gear 47 by a shaft 59.

Operation of the thumb wheel 33 causes the sheet material 28 to translate and to bring a new number column into view through the display holes 22. In the instant embodiment, it is assumed for purposes of illustration, that the number system base-value 4 has been selected for display. Therefore, the thumb wheel 33 is operated to bring zero, and the integers 1, 2, and 3 into view through the bottom four display holes 22. For clarity the sheet material 28 has an inactive and an active coloration. The inactive coloration corresponds to the color for the front of the display panel 18. Therefore, the color appearing through the unused holes 22 corresponds to the panel color, and the unused holes are not distracting.

The set value appears in an indicator window 60, and is changed by a thumb wheel 62. The thumb wheel 62 drives a display belt 63 around rollers 65 and 67. In the example the window 60 and column 12 is set to indicate an integer value of one. The corresponding windows for the columns 14 and 16 are set to indicate fours and sixteens.

A pointer 34 is mounted to ride in a vertical slot 52 on the display panel 18. The pointer 34 is carried on a link 50 which is secured to both ends of a chain 36. The chain 36 is carried over upper and lower rollers 40 and 30 respectively and produces a positive drive of the rollers during the operation of the pointer by chain engaging recesses 41 in the pulley grooves. A column contents indicator belt 42 is driven by the rotation of the pulley 40 and therefore rotates during the operation of the pointer 34. Column contents value numbers, such as the number 1 indicated, are spaced on the indicator belt 42 so that the placement of the pointer adjacent any particular integer value will produce an indication of the same integer in the display window 63. The column contents indicator belt 42 is carried on a driver roller 83 and a take-up roller 73. The roller 73 is spring biased by helical spring 75 to cause the roller 73 to tend to rotate clockwise (as viewed from the right end) about the fixed shaft 77 and to thereby take-up or dispense the display belt 42 as determined by the rotation of the pulley 40.

The final elements associated with the device are the plurality of dowels 81. These dowels serve as indicators of occupied integer places when inserted in the receptacles 24.

OPERATION

In a typical use, the student would begin a problem of counting in the number system base value four. The set value indicators would be positioned for the columns 12, 14 and 16 as described hereinbefore. The pointers would all be returned to the bottom or zero position. Then the student would be given a number of dowels and told to count them out in base value four. The concepts of zero and the density idea are reinforced by the omission of any dowel in the cylindrical receptacle 24 of the zero position and this, therefore, causes the student to place the first dowel at the integer 1 position (as illustrated in FIG. 1). The pointer 34 is then moved to that position and the column contents indicator now properly indicates that the total number of dowels in the device in the base value four number system. Subsequent dowels are placed in the receptacles correspoiding to the integers 2 and 3 and the pointer moved accordingly. However, the cylinder above the cylinder 3 is 'blocked out' or 'inactive' by the coloration on the sheet material 28. The dowels 81 are then removed from the three cylinders in which they have been placed. The pointer is returned to zero. The student now holds a bundle of four dowels which is inserted in the next available number cylinder (the integer 1 in the second column). When the pointer 34 for column 14 is moved to this position, the column contents indicator will read 0 - 1 - 0. In other words, the column contents indicator will correctly portray the total number of dowels in the base value four number system. For numbers in excess of decimal system fifteen, the student will be forced to go to a third column, in which case the first available cylinder, corresponding to the integer 1, in column 16 will contain 16 dowels.

It will occur to those skilled in the art that the above described and other exercises may be conducted for any number system which is provided for on the number scroll, and for which sufficient integer places are provided in the number columns. In the exemplary embodiment the number systems for base 2 through base 12 are available.

It is to be understood that where the exemplary embodiment employs fixedly attached receptacles that it is possible to make the receptacles removable so that inactive cylinders may be removed.

Having described my invention, I now claim:

1. Apparatus for teaching mathmatical concepts and developing skills comprising:
    a frame having a display panel,
    a plurality of number columns on said display panel,
    said number columns comprising a plurality of vertically aligned openings,
    one of a series of integers in number sequence commencing with the number zero associated with each of said openings,
    a plurality of pointers mounted for vertical movement adjacent each of said number columns to designate a specific associated integer in said number column,
    a column contents indicator operatively connected with said pointers to display the integer corresponding to the current column total content as designated by the pointer position.

2. Apparatus according to claim 1 wherein,
    each of said columns includes a column set value indicator.

3. Apparatus according to claim 1 wherein,
    a number scroll is mounted behind each number column and contains number indicia in vertical alignment to display, through the openings in said display panel, the integers for a selected number system.

4. Apparatus according to claim 3 wherein:
    said number scroll comprises two rolls containing flexible sheet material,
    a thumb wheel operatively associated with both of the rollers of each said number scroll,
    said thumb wheel protruding through said display panel for causing said flexible sheet material to be unwound from one of said rollers and wound onto the other of said rollers.

5. Apparatus according to claim 1 wherein,
said pointers drive said column contents indicator by an endless chain,
said endless chain engages a pulley connected to said indicator.

6. Apparatus for teaching mathmatical concepts and developing skills comprising:
a frame having a display panel,
a plurality of number columns on said display panel,
said number columns comprising a plurality of vertically aligned openings,
object receptacles comprising cylinders mounted over each of said aligned openings for each of the plurality of number positions in each of said columns,
a plurality of pointers mounted for vertical movement adjacent each of said number columns to designate a specific integer in said number columns,
a column contents indicator operatively connected with said pointers to display the integer corresponding to the current column total contents as designated by the pointer position.

* * * * *